United States Patent Office 2,999,725
Patented Sept. 12, 1961

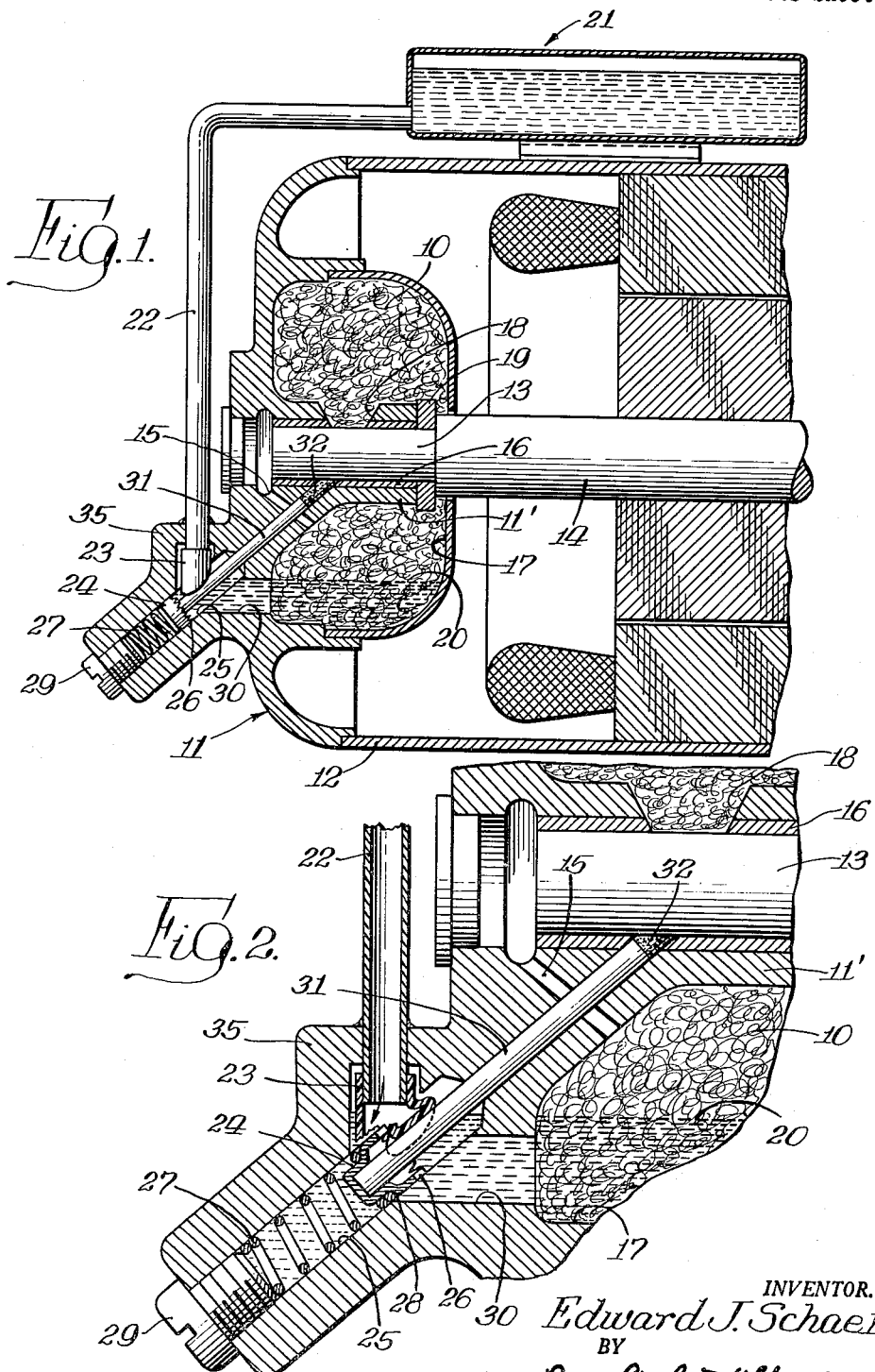

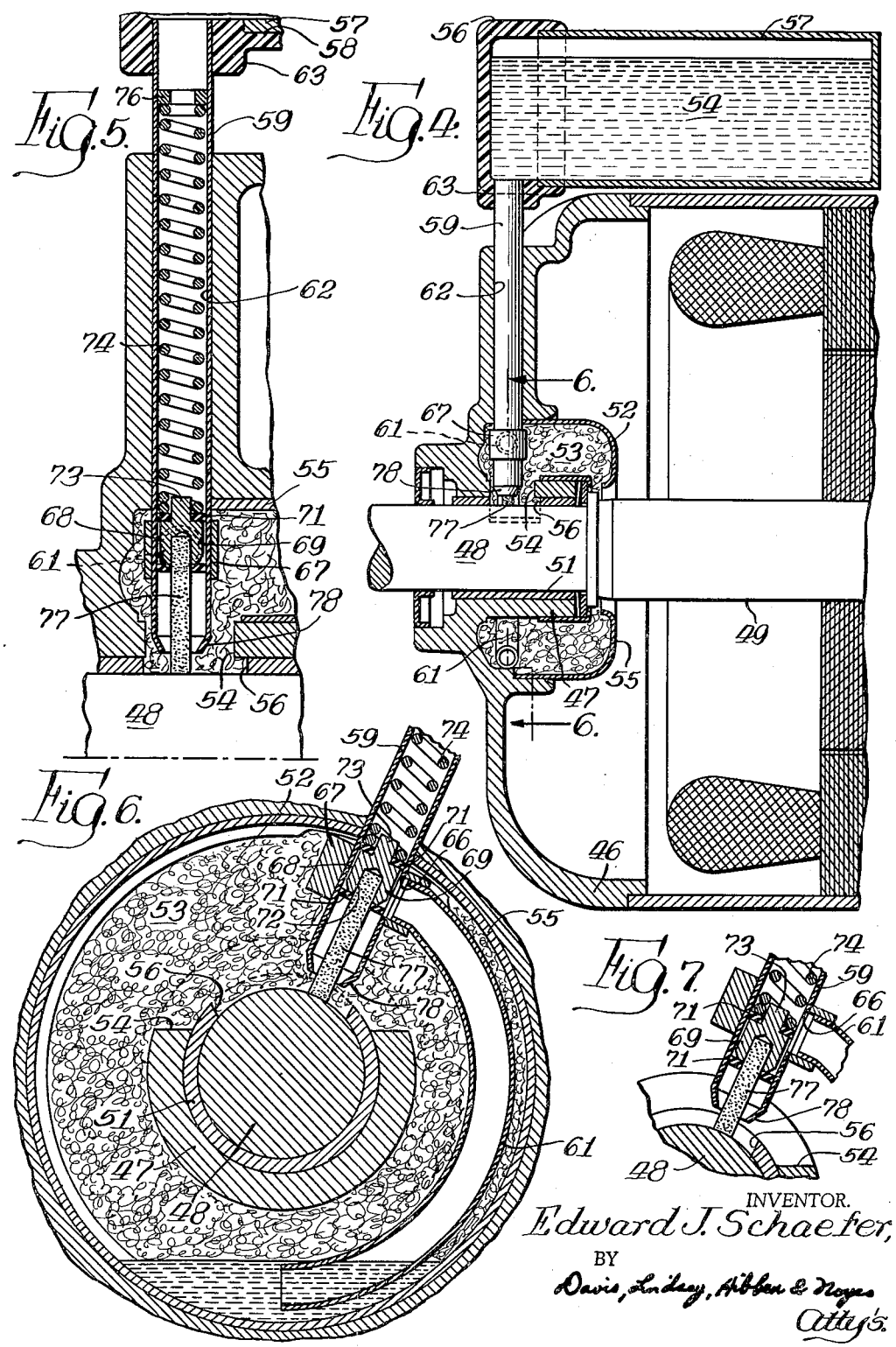

2,999,725
LUBRICATOR SYSTEM
Edward J. Schaefer, 400 E. Spring St., Bluffton, Ind.
Filed Oct. 1, 1957, Ser. No. 687,588
30 Claims. (Cl. 308—78)

This application is a continuation-in-part of my copending application, Serial Number 610,949, filed September 20, 1956, now abandoned.

This invention relates to lubricators and to means for controlling flow of lubricant to a lubricator.

Industry has long been plagued by the problems involved in providing adequate lubrication to elements of machines positioned in locations that are difficult to reach. Although such machines may be initially provided with a liberal supply of lubricant and even though they may be provided with lubricant conservation equipment, such as seals, lubricant returns, etc., a steady loss of lubricant is often experienced.

The problems of providing adequate lubrication to electric motors in situations such as that described above has long been acute. Being relatively small in size, electric motors are often installed in locations that are virtually inaccessible for purposes of lubrication. Manufacturers of electric motors, in order to alleviate such lubrication problems, have supplied motors with enlarged wick cavities and with the usual lubricant conservation equipment. However, inasmuch as lubricant cannot be free liquid during shipment, because of the danger of flooding, the amount of lubricant supplied in the unit may be only the amount that can be initially absorbed by the wick material contained in the wick cavity, and to provide enough lubricant for extended operational periods under these circumstances becomes a formidable obstacle.

Many electric motor manufacturers have side-stepped this problem by shipping an extra separate supply of lubricant along with each of their motors, together with instructions to installers to add the lubricant to the wick cavity after the unit has been installed. This solution also is not completely satisfactory. It is often difficult to educate the installers to follow instructions, and after a motor has been installed, it may be as difficult to comply with the instructions as it would be to periodically service the unit. Furthermore, wick cavity size may be dictated by considerations that preclude a capacity sufficient to carry enough lubricant for unattended operation extending for a period of years.

It is therefore a primary object of this invention to provide a lubricator that will automatically and without periodic attendance, lubricate a mechanism during an extended period of operation.

Another object is to provide a lubricator having large lubricant capacity and which may be installed in a machine and filled with lubricant by its manufacturer without danger of flooding the machine during shipment or other movement prior to operation of the machine.

A further object is to provide a lubricator for a machine that does not require special attention during installation of the machine.

Still another object is to provide a lubricator that is adapted to contain a reserve supply of liquid lubricant in such as fashion that evaporation of the lubricant is reduced.

Another object is to provide for a machine a lubricator that is adapted to contain a reserve supply of liquid lubricant, which reserve is not used until after the machine has been operated for a predetermined period.

Yet another object is to provide a lubricator for an electric motor that embraces the foregoing objects.

A still further object is to provide means to control the flow of lubricant to a lubricator from a reserve supply.

Other objects and advantages of the invention will become apparent from the subsequent description taken in conjunction with the acompanying drawings wherein:

FIG. 1 is a sectional view of a portion of an electric motor provided with one embodiment of the invention;

FIG. 2 is a view on an enlarged scale of a portion of the mechanism shown in FIG. 1 but as it would appear after operation of the motor for a predetermined period;

FIG. 4 is a view similar to FIG. 1 showing a third embodiment of the invention;

FIG. 5 is an enlarged view of a portion of the structure shown in FIG. 4;

FIG. 6 is an enlarged sectional view of part of the structure shown in FIG. 4 as viewed along the line 6—6; and FIG. 7 shows part of the structure shown in FIG. 6 as it would appear after a period of operation.

Figure 3:
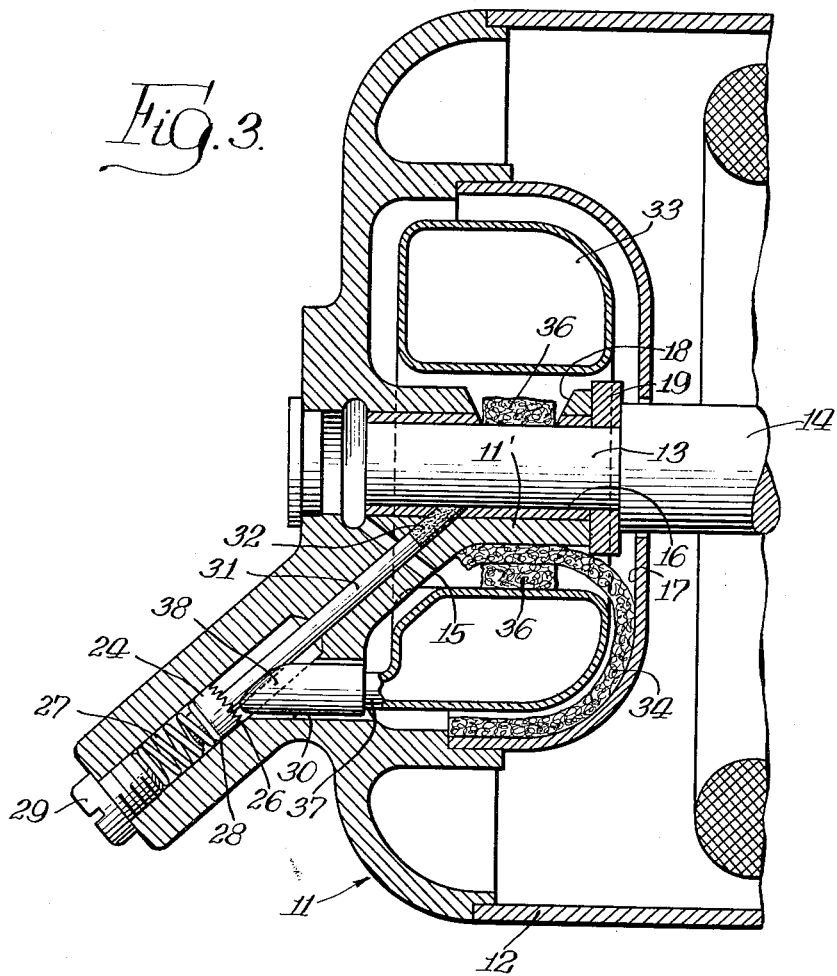
FIG. 3 is a view similar to FIG. 1, on an enlarged scale, showing a second embodiment of the invention.

Briefly stated, the objects of this invention are accomplished by providing a lubricator that has a primary lubricant reservoir, which may be a wick cavity, adjacent the mechanism to be lubricated, and a reserve lubricant reservoir having a flow connection into the primary reservoir. The reserve reservoir is initially sealed or closed to prevent lubricant flow and evaporation therefrom during shipment and prior to operation of the mechanism. The lubricator is also provided with means for automatically opening such seal or closure as a consequence of operation of the mechanism for a predetermined period.

For purposes of illustration, the invention is shown for use in connection with an elecric motor. Thus, FIGS. 1 and 2 show an end bell 11 of such a motor. The end bell 11 is illustrated as secured to motor frame 12 to enclose the end of the motor and has a hub portion 11' to support one journal 13 of the motor rotor shaft 14. The journal 13 turns in a bearing 16 mounted in the hub portion 11'. Lubrication of the bearing 16 and the journal 13 is accomplished, in this instance, by providing the end bell 11 with a primary lubricant reservoir or wick cavity 17 which is, in this instance, packed loosely with an appropriate oil wick material 10. The wick material 10 protrudes through an opening 18 in the hub portion 11' and the bearing 16 to ride against the journal 13, and maintains lubricant thereon to circulate between the opposing surfaces of the bearing 16 and journal 13. The lubricant works along the journal and at the inner end of the bearing 16 an oil slinger 19 on shaft 14 returns the lubricant to the wick cavity 17 by centrifugal force. The other end of the journal and bearing is closed, and lubricant is collected in an appropriate groove and returned to the wick cavity by an oil return passage 15.

In order to provide sufficient lubricant capacity for extended unattended operation, a reserve supply of lubricant is provided. The reserve supply is held, in the present instance, by a reserve reservoir 21 positioned above the motor. The remote position of the reservoir 21 from the motor subjects only that amount of lubricant in cavity 17 to the heat of the motor and lessens evaporation. The reserve reservoir 21 is an airtight lubricant-filled container having its outlet connected to an extension 30 of the wick cavity 17, which extension is formed in a portion 35 extending from the end bell 11 below the journal 13. The reserve reservoir 21 is connected to the extension 30 by conduit means comprising a tube 22 which projects into the portion 35 of the end bell 11 beyond and below the end of the journal 13. With this arrangement it is seen that, although lubricant may be withdrawn by other means, by virtue of the elevated location of the reserve reservoir 21 and the airtight character of reserve reservoir 21 and tube 22, lubricant will flow by gravity from the reserve reservoir 21 into the cavity 17. Moreover, it will flow from the reservoir 21 only when the lubricant level in the cavity 17 is below the end of the tube 22, since only then can air enter the reservoir 21 to replace lubricant. Thus, the position of the end of tube 22 relative to the wick cavity 17 fixes the lubricant level in the cavity, such as at 20, which level will remain constant once the reserve reservoir functions and until the reserve supply of lubricant is exhausted. Furthermore, because of the airtight character of the reserve reservoir 21, evaporation is further reduced and the reservoir 21 may be as large as is required to yield the lubricant life desired, without any probability of flooding the motor during operation.

It is contemplated that the reserve reservoir 21 as well as the wick cavity 17 will be filled with lubricant by the manufacturer prior to shipment of the motor, so that the installer need not concern himself with the problem of lubrication either at the time of installation or thereafter. To prevent the possibility of flooding the motor during shipment and installation prior to use, when the motor might be in positions other than substantially upright, the outlet or conduit means is sealed or closed for preventing lubricant flow therefrom. In the present instance the seal or closure comprises a thin plastic cap 23 disposed over the end of tube 22.

Wick cavities, such as 17, often have a lubricant capacity that will provide lubrication to the bearing, for a substantial period of time, without the addition of oil from the reserve reservoir 21. Thus, it is preferable that flow communication between the primary reservoir and the reserve reservoir be not established until after a substantial period of operation. To this end, means is provided for automatically opening the outlet or conduit means as a consequence of a predetermined period of motor operation. In other words, the opening means operates to open the outlet when the journal 13 has rotated a predetermined amount. In the instant embodiment, the opening means comprises a cup shaped element 24 disposed adjacent cap 23 in a bore 25 in the end bell 11, and intersecting the extension 30. The edge of cup element 24 is serrated to provide a plurality of teeth 26. The cup element 24 is positioned so that cap 23 will be pierced by teeth 26 upon movement of the cup element in the bore 25, which, in this instance, extends generally transverse to the cap 23 and at an angle toward the journal 13. To actuate the cup element 24, one end of a coiled compression spring 27 engages a shoulder 28 formed by reducing the diameter of the closed end of the cup element. The other end of the spring 27 bears against a screw 29 threaded in and closing the external end of the bore 25, the spring 27 being compressed to urge the cup element 24 toward cap 23.

The cup element 24 is initially restrained from movement by elongated rod means comprising a rod 31 positioned in the bore 25 and having one end seated in the cup element 24. The opposite end of the rod 31 bears against a portion 32 of abradable material, such as a soft graphite that is not harmful to the bearing and journal. The portion 32 in turn bears against the journal 13. Initially the combined length of rod 31 and portion 32 is sufficient to prevent engagement of the cup element 24 with the cap 23, as shown in FIG. 1. In consequence of operation of the motor, however, the portion 32 is gradually worn away at a predetermined rate by the rotation of the journal 13, and after a period of operation, portion 32 is sufficiently worn away to permit the cup element 24 to be moved by the spring and to puncture or tear the cap 23, as seen in FIG. 2. Hence, movement of the element 24 is proportional to the amount of journal rotation. By adjusting the composition of the material of the portion 32 and by adjusting the strength of the spring 27, the operating time required to effect the opening of the cap 23 may be varied to any desirable extent.

After the cap 23 has been opened, lubricant in the reserve reservoir 21 is free to flow by gravity into cavity 17 until the level of the oil in cavity 17 covers the lower end of tube 22, such as at 20. At this time no further flow will occur because air cannot enter the reserve reservoir 21 to replace the oil. Thereafter, as oil in the cavity 17 is used, further flow will occur from the reserve reservoir 21, but only to the extent necessary to maintain the level at 20.

FIG. 3 illustrates a second embodiment of the invention, and provides a more compact arrangement for installations wherein space is a primary concern. Many of the elements illustrated in connection with this embodiment are substantially identical in structure and function to those illustrated in FIGS. 1 and 2 and, for convenience, such elements have been given the same reference numerals. Basically, this embodiment differs from that previously described, in that its reserve reservoir 33 is positioned within the end bell 11 of the motor. The reserve reservoir 33 is, in this instance, a doughnut-shaped container disposed around the bearing 16 within the wick cavity 17 in spaced relation to the wall thereof, and generally concentric therewith.

Because the available volume of the wick cavity 17 is materially reduced by the inclusion of the reserve reservoir 33 therein, sheet wick material 34 is disposed in the bottom portion of the wick cavity, and is bent to conform to the space between the inner wall of the cavity 17 and the outer wall of reservoir 33. The wick material 34 provides lubricant communication between the bottom of the wick cavity 17 and additional wick material 36 that surrounds the bearing 16 and protrudes into the opening 18. The wick material 34 and 36 is initially saturated with lubricant to provide the initial lubrication to the bearing heretofore described.

The reserve reservoir 33, like the reservoir 21 of the previously described embodiment, is an airtight lubricant filled container. In the present instance, however, a tube 37 extends horizontally from the bottom of reservoir 33 into the extension 30 of wick cavity 17. The end of the tube 37 is also closed by a plastic cap 38 sealed thereon and located so that it will be punctured as the cup element 24 is moved against it, as previously described in conjunction with the embodiment shown in FIGS. 1 and 2. The cavity extension 30 is sufficiently large that ample space exists between its wall and the tube 37 and cap 38 for lubricant issuing from the tube 37 to flow therethrough to the wick material 34.

Although after the cap 38 has been opened, lubricant in the reserve reservoir 33 is free to flow into the bottom of the wick cavity 17 to the wick material 34, such flow will only occur when the lubricant level in the cavity 17 is below the opened end of the tube 37. Thus, this embodiment of the invention provides many of the advantageous features that are provided by the first embodiment described. The capacity of the reserve reservoir 33 is limited in this instance by the volume of the wick cavity 17, however.

A third form of the invention is illustrated in FIGS. 4–7, inclusive. This form of the invention is also illustrated in connection with an electric motor, having an end bell 46 of the motor. The end bell 46 has a hub portion 47 for supporting a journal 48 of the motor rotor shaft 49. The journal 48 rotates in a bearing 51 mounted in the hub portion 47.

As in the forms of the invention above described, the end bell 46 is provided with a primary lubricant reservoir or wick cavity 52. The primary reservoir 52, again, is shown as concentric with the journal 48 and is formed by a sheet metal cover 55 fitting within a flange formed on the end bell. The primary reservoir is loosely packed with an oil wick material 53 and the hub 47 and the bearing 51 are provided with aligned openings 54 and 56, respectively, through which the wick material 53 protrudes and contacts the journal 48. Thus, the wick material 53 is positioned to carry lubricant to the surface of the journal 48. The lubricant works along the journal during the operation of the motor in substantially the same fashion as in the forms of the invention above described.

As shown in FIG. 4, the instant form of the invention is provided with a reserve reservoir 58 positioned above the motor casing. The reserve reservoir 58 is shown as comprising a cap member 56 and a body member 57. The reserve reservoir 54 is connected to the primary reservoir 52 by conduit means comprising, in this instance, a pair of connected tubes 59 and 61, which provide the outlet for the reserve reservoir. The tube 59 is a substantially straight tube that extends from the reserve reservoir 54 into the primary reservoir 52. A bore 62 is provided through the end bell 46, the bore extending downwardly into the primary reservoir 52 radially toward the openings 54 and 56 in the hub and bearing and the journal 48. The tube 59 is inserted and secured in the bore 62 so that the end bell supports a substantial portion of the tube intermediate the ends thereof. The outer end of the tube 59 is connected to the reserve reservoir through a boss 63 formed on the cap member 56, the boss 63 gripping the tube 59 to provide an airtight seal therebetween. A portion of the tube 59 adjacent its inner end projects into the primary reservoir adjacent the journal 48, and a lateral opening 66 is provided through the wall of that portion, the opening 66 being spaced outwardly somewhat from the inner end of the tube.

The outlet or conduit means from the reserve reservoir 54 to the primary reservoir 52 is completed by the tube 61. The upper end of the tube 61 is connected, as by a fitting 67, to the tube 59 over the opening 66. The tube 61 curves around the hub 47, the bearing 51, and the journal 48 to a point adjacent the bottom of the primary reservoir 52, as shown in FIGS. 4 and 6. The fitting 67 provides an air-tight connection between the tubes 59 and 61.

As in the preceding forms of the invention, the conduit means in the instant case is sealed initially against lubricant flow therethrough. In this case, the closure or seal comprises a piston-like valve member 68 slidably mounted in the bore of the tube 59. The valve member 68 comprises a piston 69 and a pair of sealing gaskets or washers 71. The piston 69 is provided with a bore 72 in its lower end and an axially extending boss 73 on its upper end. One washer or gasket 71 is placed on the upper end of the piston 69 around the boss 73 and the other washer 71 is mounted on the lower end of the piston 69 about the bore 72. The gaskets 71 sealingly engage the wall of the tube 59. Initially the valve member 68 is positioned so that at least one of the gaskets 71 is intermediate the opening 66 and the reserve reservoir 54, thus closing the same.

The means for opening the seal or closure, in the present instance, comprises a spring 74 that is disposed in the bore of the tube 59 in compression between the upper end of the valve member 68 and an abutment washer 76. The washer 76 is rigidly mounted in the tube 59 intermediate the opening 66 and the reserve reservoir 54. One end of the spring 74 bears against the washer 76 and the other end thereof bears against the upper surface of the gasket or washer 71 about the boss 73. Thus, the spring 74 normally urges the piston inwardly toward the journal 48. In addition, the bearing of the spring improves the sealing engagement between the sealing gasket 71 and the tube 59 and holds the gasket 71 on the piston.

In order to restrain the valve member or piston 68 so that it will remain closed until the motor has been operated a predetermined period, a rod 77 of abradable material is interposed between the valve member 68 and the journal 48. One end of the rod 77 bears against the journal 48 to be abraded thereby, and the other end is disposed in the bore 72 and bears against the piston 69. Initially the rod 77 is sufficiently long to hold the valve member 68 so that it seals the opening 66, as is illustrated in FIGS. 5 and 6 of the drawing. The rod 77 is of the same type of material as that described in connection with the other forms of the invention. Therefore, as the journal 48 rotates, the rod 77 will be abraded thereby and its length reduced. Abrading of the rod 77 allows the spring 74 to move the valve member 68 inwardly towards the journal. Eventually, after the journal has been operated for a predetermined period, the rod 77 will have been abraded sufficiently to permit the valve member 68 to move to the position shown in FIG. 7. Thus the opening 66 is unsealed and flow communication is established between the reserve reservoir 54 and the primary reservoir 52 through the tubes 59 and 61. Lubricant is then free to flow from the reserve reservoir to the primary reservoir whenever the level of lubricant in the latter is below the lower end of the tube 61. The lower gasket or washer 71 provides a seal between the piston 69 and the tube 59 to prevent air from entering the reserve reservoir when the piston 69 is in the partially open position shown in FIG. 7.

In order to prevent engagement between the piston member 68 and the journal 48 when the rod 77 is ultimately worn away, the inner end of the tube 59 is formed to provide a restriction limiting movement of the piston 68. In this instance, the inner end of the tube 59 is tapered as at 78 to partially close the bore thereof. Thus, the valve member 68 will ultimately engage the partially closed portion 78 and further inward movement will be prevented.

It is thus seen that the novel lubricators herein described will automatically and without attendance lubricate a mechanism during extended periods of operation. They may be installed and filled with lubricant during assembly of the mechanism they are to lubricate and require no further special attention by installers during installation of the mechanism. Moreover, they effectively avoid the probability of flooding such mechanism during shipment or other movement that may occur prior to operation of the mechanism to be lubricated, and are particularly well adapted for use in conjunction with electric motors.

Although the invention has been described in connection with certain specific structural embodiments of the invention it is to be understood that various modifications and alternative structures may be resorted to without departing from the scope of the invention as defined in the appended claims.

I claim:

1. A bearing lubricator comprising a primary liquid lubricant reservoir adapted to be located adjacent a bearing, means for depositing lubricant from said primary reservoir upon the contacting surfaces of the bearing and a journal operable therein, an airtight reserve lubricant reservoir, airtight conduit means interconnecting said reservoirs for carrying lubricant by gravity from said reserve reservoir to said primary reservoir, said conduit means having its outlet located in said primary reservoir at a point such that the lubricant will flow from said reserve reservoir to said primary reservoir only when the lubricant level in said primary reservoir is below said outlet, sealing means for said conduit means for preventing lubricant flow therethrough, and means responsive to operation of the journal for automatically opening said sealing means upon operation of the journal for a predetermined period.

2. A bearing lubricator comprising a primary liquid lubricant reservoir adapted to surround a bearing and having a wick material therein for supplying the lubricant from said primary reservoir to the contacting surfaces of the bearing and a journal operable therein, an airtight reserve reservoir, airtight conduit means between said reserve and said primary reservoirs for carrying lubricant by gravity from said reserve reservoir to said primary reservoir, said conduit means having its outlet located at a point in said primary reservoir such that lubricant will flow therein only when the lubricant level in the primary reservoir is below said outlet to maintain lubricant in said primary reservoir for said wick material, sealing means for said conduit means for preventing lubricant flow therethrough, and means responsive to operation of the journal for automatically opening said sealing means upon operation of the journal for a predetermined period.

3. A bearing lubricator comprising a primary liquid lubricant reservoir adapted to be located adjacent a bearing, means for depositing lubricant from said primary reservoir upon the contacting surfaces of such bearing and a journal operable therein, a reserve lubricant reservoir having an initially closed outlet to said primary reservoir, and means movable in response to the rotation of such journal and operable to open said outlet when said journal has operated a predetermined period, the movement of said opening means being proportional to the amount of rotation of the journal.

4. A bearing lubricator comprising a primary liquid lubricant reservoir adapted to be located adjacent a bearing, means for depositing lubricant from said primary reservoir upon the contacting surfaces of such bearing and a journal operable therein, a reserve lubricant reservoir having an initially closed outlet to said primary reservoir, and means for opening said outlet, said opening means comprising an elongated rod having one end positioned to press against such journal and a spring for urging said rod longitudinally, said one end of said rod being of abradable material, movement of said rod a predetermined amount toward said journal due to abrading of said material opening said outlet.

5. In combination, an end bell for supporting a journal on an electric motor shaft together with a bearing therefor, said bell having a primary reservoir therein positioned to surround the journal and bearing and adapted to contain therein a quantity of liquid lubricant and wick material for depositing the lubricant on the contacting surfaces between the journal and the bearing, a reserve lubricant reservoir, conduit means interconnecting said reserve reservoir and said primary reservoir for carrying lubricant from said reserve reservoir to said primary reservoir, sealing means for said conduit means for preventing lubricant flow therethrough, and means movable in response to operation of the journal and operable for automatically opening said sealing means upon operation of the journal for a predetermined period, the movement of said opening means being proportional to the amount of rotation of the journal.

6. In combination, an end bell for an electric motor and adapted to support a journal on the motor shaft together with a bearing therefor, said bell having therein a primary reservoir positioned to surround the journal and bearing and adapted to contain a quantity of liquid lubricant and wick material for depositing the lubricant on the contacting surfaces between the journal and the bearing, an air tight reserve lubricant reservoir adapted to be mounted on the motor, air tight conduit means interconnecting said reserve reservoir and said primary reservoir for carrying the lubricant by gravity from said reserve reservoir to said primary reservoir and comprising a tube with its end located in the lower portion of said primary reservoir, the lubricant flowing from said reserve reservoir into said primary reservoir only when the lubricant level in said primary reservoir is below the end of said tube, sealing means for said conduit means for preventing lubricant flow therethrough, and means responsive to operation of the journal for automatically opening said sealing means upon operation of the journal for a predetermined period.

7. A bearing lubricator comprising a primary liquid lubricant reservoir adapted to surround a bearing, means for depositing lubricant from said primary reservoir upon the contacting surfaces of the bearing and a journal operable therein, said primary reservoir including a cavity in one wall thereof below the bearing location, an airtight reserve reservoir, airtight conduit means interconnecting said reservoirs for carrying lubricant by gravity from said reserve to said primary reservoir and comprising a tube extending from said reserve reservoir into said cavity for establishing flow communication between said reservoirs, the end of said conduit means being located at a point such that the lubricant will flow from said reserve reservoir to said primary reservoir only when the lubricant level in said primary reservoir is below said end, sealing means for said conduit means for preventing lubricant flow therethrough, and means responsive to operation of the journal for automatically opening said sealing means upon operation of the journal for a predetermined period.

8. A bearing lubricator comprising lubricant saturated means adapted to be located adjacent a bearing for depositing lubricant upon the contacting surfaces of the bearing and a journal operable therein, a lubricant reservoir having an outlet to said lubricant saturated means, a thin plastic seal for said outlet to prevent lubricant flow therethrough, puncturing means having a toothed element adjacent said seal and positioned to pierce said seal upon movement in one direction, and actuating means carrying said toothed element and restrained to gradually move said element in said one direction in response to rotation of the journal to effect piercing of said seal upon rotation of the journal for a predetermined period, the movement of said opening means being proportional to the amount of rotation of the journal.

9. A bearing lubricator comprising lubricant saturated means adapted to be located adjacent a bearing for depositing lubricant upon the contacting surfaces of the bearing and a journal operable therein, a lubricant reservoir, conduit means extending from said reservoir to said lubricant saturated means, a thin plastic cap on the end of said conduct means and puncturing means having a toothed element adjacent said cap and positioned to pierce said cap, and actuating means carrying said element for gradually moving said element generally transversely of the end of said tube in response to rotation of the journal to effect piercing of said cap upon rotation of the journal for a predetermined period, the movement of said opening means being proportional to the amount of rotation of the journal.

10. A bearing lubricator comprising lubricant saturated means adapted to be located adjacent a bearing for depositing lubricant upon the contacting surfaces of the bearing and a journal operable therein, a lubricant reservoir having an outlet to said lubricant saturated means, a thin plastic seal for said outlet to prevent lubricant flow therethrough, and puncturing means adjacent said seal and comprising a toothed element positioned to pierce said seal upon movement in one direction, a spring urging said toothed element in said one direction, and restraining means opposing said spring but gradually moving in said one direction in response to rotation of the journal, thereby allowing said toothed element to pierce said sealing means in response to rotation of the journal for a predetermined period.

11. A bearing lubricator comprising lubricant saturated means adapted to be located adjacent a bearing for depositing lubricant upon the contacting surfaces of the bearing and a journal operable therein, a lubricant reservoir having an outlet to said lubricant saturated means, a thin plastic seal for said outlet to prevent lubricant flow therethrough, and puncturing means adjacent said seal and comprising a toothed cup-shaped element positioned to pierce said seal upon movement of said element along an axis extending toward the journal, a spring engaging said element to urge said element along said axis, and elongated rod means projecting along said axis with one end positioned to press against the journal and the other end engaging said element, said one end being of abradable material, said rod means being sufficiently long initially to restrain said spring and prevent contact between said element and said seal, said one end being abradable gradually by rotation of the journal to permit said toothed cup to pierce said seal upon rotation of the journal for a predetermined period.

12. A bearing lubricator comprising a primary liquid lubricant reservoir adapted to surround a bearing, means for depositing lubricant from said primary reservoir upon contacting surfaces of the bearing and a journal operable therein, said primary reservoir including an extension in one wall below the bearing, an air tight reserve reservoir above said primary reservoir, air tight conduit means interconnecting said reservoirs for carrying lubricant from said reserve reservoir to said primary reservoir and comprising a tube extending downwardly from said reserve reservoir with its end located in said extension so that lubricant will flow from said reserve reservoir to said primary reservoir only when the lubricant level in said primary reservoir is below said end, a thin plastic seal on said end of said tube to prevent lubricant flow therethrough, and puncturing means in said extension comprising a toothed cup-shaped element positioned to pierce said seal upon movement of said element along an axis extending toward the journal, a spring engaging said element to urge said element along said axis, and elongated rod means projecting along said axis so that one end is positioned to press against the journal and the other end engages said element, said one end being of soft graphite, said rod means being sufficiently long initially to restrain said spring and prevent contact between said element and said seal, said graphite end being abradable gradually by rotation of the journal to permit said toothed element to pierce said seal upon rotation of the journal for a predetermined period.

13. In combination, a journal on an electric motor shaft, a bearing therefor, an end bell for supporting said bearing and said journal, said bell having a primary reservoir positioned to surround said bearing and said journal and adapted to contain therein a quantity of liquid lubricant and wick material for depositing the lubricant on the contacting surfaces between said journal and said bearing, a portion of said bell together with a portion of said primary reservoir extending beyond the end of and below said journal and bearing, an air tight reserve lubricant reservoir adapted to be mounted on the motor above said primary reservoir, air tight conduit means interconnecting said reserve reservoir and said portion of said primary reservoir and comprising a tube extending downwardly into said portion of said primary reservoir, the lubricant flowing from said reserve reservoir only when the lubricant level in said primary reservoir is below the end of said tube, a thin plastic cap on the end of said tube for preventing lubricant flow therethrough, puncturing means adjacent said cap and comprising a toothed element positioned to pierce said cap upon movement of said element along an axis extending generally transverse the end of said tube toward said journal, a spring engaging said element so as to urge said element along said axis, and elongated rod means projecting along said axis so that one end is positioned to press against the journal and the other end engages said element, said one end being of soft graphite, said rod being sufficiently long initially to restrain said spring and prevent contact between said element and said cap, said graphite end being abradable gradually by rotation of the journal to permit said toothed element to pierce said cap upon rotation of the journal for a predetermined period.

14. A bearing lubricator comprising a primary lubricant reservoir adapted to be located adjacent a bearing and containing means for depositing lubricant upon the contacting surfaces of the bearing and a journal operable therein, an airtight reserve lubricant reservoir in said primary reservoir, outlet means on said reserve reservoir located so that lubricant will flow from said reserve reservoir to said primary reservoir only when the lubricant level in said primary reservoir is below said outlet, sealing means for said outlet means for preventing lubricant flow therethrough, and means responsive to operation of the journal for automatically opening said sealing means upon operation of the journal for a predetermined period.

15. A bearing lubricator according to claim 14 and further characterized in that said primary reservoir is adapted to embrace the circumferential periphery of the bearing and said reserve reservoir comprises a doughnut-shaped container position in said primary reservoir to be substantially concentric therewith about the bearing and with said outlet means adjacent the bottom of the primary reservoir.

16. A bearing lubricator comprising a primary liquid lubricant reservoir adapted to embrace the circumferential periphery of a bearing, means for depositing lubricant from said primary reservoir upon the contacting surfaces of the bearing and a journal operable therein, said primary reservoir having a cavity in one wall adjacent the bottom of the reservoir, a circular doughnut-shaped reserve reservoir positioned in said primary reservoir to be substantially concentric therewith about the bearing, outlet means for said reserve reservoir, said outlet means extending from said reserve reservoir into said cavity, sealing means on said outlet means in said cavity, and means responsive to operation of the journal for automatically opening said sealing means upon operation of the journal for a predetermined period.

17. A bearing lubricator according to claim 16 and further characterized in that said outlet means comprises a tube extending horizontally from the bottom of said reserve reservoir into said cavity with the sealing means positioned on the outer end thereof in said cavity.

18. A bearing lubricator comprising a primary liquid lubricant reservoir adapted to be located adjacent a bearing, and journal therein for supplying lubricant thereto, a reserve lubricant reservoir having an outlet to said primary reservoir, initially closed valve means for said outlet, and means movable in response to operation of the journal and operable for automatically opening said valve means upon the rotation of the journal for a predetermined period, the movement of said opening means being proportional to the amount of rotation of the journal.

19. A bearing lubricator according to claim 18 in which said valve means comprises a tube depending from said reserve reservoir, said tube having an opening in its wall intermediate its ends communicating with said outlet, and an axially movable piston in said tube in sealing relation therewith and initially closing said opening.

20. A bearing lubricator according to claim 18 in which said means for automatically opening said valve means comprises a spring disposed in engagement with said valve means and urging said valve means to open position, and a rod of abradable material positioned to oppose said spring, one end of said rod being positioned to press against the journal and be abraded thereby, the abrading of said rod releasing said spring to effect the opening of said valve means in response to the rotation of the journal.

21. A bearing lubricator comprising a primary liquid lubricant reservoir adapted to surround a bearing for lubricating the same and a journal operable therein, an airtight reserve reservoir positioned above said primary reservoir, a first tube connected into and depending from said reserve reservoir, said first tube projecting toward such bearing and journal, a second tube having one end communicating with said first tube adjacent its lower end, said second tube extending into said primary reservoir to a point adjacent the bottom thereof, said tubes forming a continuous airtight conduit from said reserve reservoir to said primary reservoir such that the lubricant will flow from the former to the latter only when the lubricant level in the latter is below said point, a piston disposed in the bore of said first tube and initially positioned to prevent flow to said second tube, a spring disposed in the bore of said first tube and urging said piston to an open position, permitting flow to said second tube, and a rod of abradable material initially preventing movement of said piston by said spring and positioned to press against the journal and be abraded thereby, the abrading of said rod permitting movement of said piston to said open position in response to the rotation of the journal.

22. A bearing lubricator according to claim 21 in which said piston has a gasket at its upper end engaging said first tube, and said rod is seated in a bore in the lower end of said piston.

23. A bearing lubricator according to claim 22, in which said spring bears against said gasket to hold it in place on said piston.

24. A bearing lubricator according to claim 21 in which said piston carries a pair of vertically spaced gaskets, the upper gasket preventing flow from said reserve reservoir when said piston is in its closed position and the lower gasket preventing admission of air to said reserve reservoir when said piston is in the partially open position.

25. Means for controlling the supplying of lubricant to a primary lubricant reservoir located adjacent a bearing and a journal operable therein from a reserve reservoir having an outlet within said primary reservoir, said means comprising a member movable for opening said outlet, and means of abradable material for restraining said opening means and adapted to contact said journal to be abraded thereby as a consequence of journal operation, said restraining means when abraded to a predetermined extent permitting said opening means to open said outlet.

26. A bearing lubricator comprising a primary lubricant reservoir adapted to be located adjacent a bearing for depositing lubricant from said primary reservoir upon the contacting surfaces of the bearing and a journal operable therein, a reserve lubricant reservoir having an initially closed outlet within said primary reservoir, means for opening said outlet, and consumable means for restraining said opening means and adapted when consumed to a predetermined extent to release said opening means, said consumable means being adapted to be consumed by rotation of said journal and when consumed to said predetermined extent permitting said opening means to open said outlet.

27. A bearing lubricator comprising a primary lubricant reservoir adapted to be located adjacent a bearing and in lubricating relation thereto, a reserve lubricant reservoir having an outlet communicating with said primary reservoir, means movable in one direction for effecting discharge of lubricant from said reserve reservoir to said primary reservoir through said outlet, means for constantly urging said movable means in said one direction, and means for restraining movement of said movable means and adapted to be shortened as a consequence of journal rotation, the shortening of said restraining means permitting said urging means to effect movement of said movable means in said one direction.

28. A bearing lubricator comprising a reserve lubricant reservoir having an outlet located adjacent a journal-bearing assembly to be lubricated, means movable in one direction for effecting discharge of lubricant from said reservoir through said outlet, means for constantly urging said movable means in said one direction, and consumable means projecting into the path of movement of said movable means to restrain such movement and adapted to be consumed as a consequence of journal operation, the consuming of said restraining means removing the latter from said path and permitting said urging means to effect movement of said movable means in said one direction.

29. A bearing lubricator according to claim 28, in which said consumable means is of abradable material adapted to be located so it will be progressively worn away and thus consumed as a consequence of journal operation.

30. A bearing lubricator according to claim 28, in which said consumable means is located to engage against the journal and is progressively shortened by wear as said journal rotates.

References Cited in the file of this patent

UNITED STATES PATENTS

| | | |
|---|---|---|
| 477,319 | Wilson | June 21, 1892 |
| 1,148,493 | Ames | Aug. 3, 1915 |
| 1,470,165 | Haney | Oct. 9, 1923 |
| 1,715,840 | Janette | June 4, 1929 |
| 2,024,536 | Pearce | Dec. 17, 1935 |
| 2,528,817 | Brandt | Nov. 7, 1950 |
| 2,579,039 | Evans | Dec. 18, 1951 |
| 2,672,951 | Bogert | Mar. 23, 1954 |